United States Patent
Sung et al.

(10) Patent No.: US 10,122,318 B2
(45) Date of Patent: Nov. 6, 2018

(54) SYSTEM ON-CHIP FOR CONTROLLING MOTOR BASED ON NETWORK AND METHOD FOR CONTROLLING THEREOF

(71) Applicant: AJINEXTEK CO., LTD, Daegu (KR)

(72) Inventors: Kwang Ju Sung, Busan (KR); Chang Ho Kim, Daegu (KR); Sung Hyuk Choi, Daegu (KR); Sang Tae Lee, Daegu (KR)

(73) Assignee: AJINEXTEK CO., LTD, Daegu (KR)

( * ) Notice: Subject to any disclaimer, the term of this patent is extended or adjusted under 35 U.S.C. 154(b) by 601 days.

(21) Appl. No.: 14/760,502

(22) PCT Filed: Apr. 24, 2013

(86) PCT No.: PCT/KR2013/003500
§ 371 (c)(1),
(2) Date: Jul. 13, 2015

(87) PCT Pub. No.: WO2014/126295
PCT Pub. Date: Aug. 21, 2014

(65) Prior Publication Data
US 2015/0357963 A1   Dec. 10, 2015

(30) Foreign Application Priority Data
Feb. 12, 2013 (KR) .......... 10-2013-0014785

(51) Int. Cl.
*G05B 15/00* (2006.01)
*H02P 31/00* (2006.01)
(Continued)

(52) U.S. Cl.
CPC .............. *H02P 31/00* (2013.01); *G05B 15/02* (2013.01); *H04L 67/125* (2013.01)

(58) Field of Classification Search
CPC .............................. H02B 31/00; G05B 15/02
(Continued)

(56) References Cited

U.S. PATENT DOCUMENTS

2008/0084171 A1*   4/2008   Leehey ................ G05B 19/042
                                                                318/34

FOREIGN PATENT DOCUMENTS

KR         101058030 B1       8/2011

OTHER PUBLICATIONS

Khan, Rafiqul Z et al., Current Trends in Parallel Computing, Dec. 2012, International Journal of Computer Applications, vol. 59—No. 2, pp. 19-25.*
(Continued)

*Primary Examiner* — Mohammad Ali
*Assistant Examiner* — Sheela Rao
(74) *Attorney, Agent, or Firm* — Kaplan Breyer Schwarz, LLP (57) ABSTRACT

A network-based motor control system-on-chip (SoC) and a motor control method. The network-based motor control system includes a network unit; a first processor for exchanging a first data with the network unit and processing a first task related to the first data; a motor; a motor control unit for controlling operation of the motor; a second processor for exchanging a second data related to the operation of the motor with the motor control unit and processing a second task related to the second data; and a data sharing unit for sharing processing results of the first task and the second task by the first processor and the second processor, in which the first task and the second task are concurrently processed.

7 Claims, 7 Drawing Sheets (51) Int. Cl.
*H04L 29/08* (2006.01)
*G05B 15/02* (2006.01)

(58) Field of Classification Search
USPC .......................................................... 700/275
See application file for complete search history.

(56) References Cited

OTHER PUBLICATIONS

"International Application No. PCT/KR2013/003500 International Search Report", dated Aug. 27, 2013, Publisher: International Searching Authority / KR, Published in: KR.

Mu-Gyung Jung, et al., "Tech and Trend of a parallel Processor", "Trend Analysis of Electronic and Communication Tech", Dec. 2009, pp. 86-93, vol. 24, No. 6, Publisher: ETRI.

* cited by examiner

SYSTEM ON-CHIP FOR CONTROLLING MOTOR BASED ON NETWORK AND METHOD FOR CONTROLLING THEREOF

FIELD OF THE INVENTION

The present invention relates to a network-based motor control system-on-chip (SoC) and a motor control method, and more specifically, to a network-based motor control system-on-chip (SoC) and a motor control method, in which system performance is improved by simultaneously using a processor for motor control and a processor for a network and sharing data among multiple processors using a shared memory (SRAM).

BACKGROUND OF THE INVENTION

An AC servomotor is a motor used for an AC servo equipment. Generally, the AC servomotor is a two-phase induction motor, and a stator is configured of a reference field winding and a control field winding orthogonal to each other.

In addition, since the two windings of the AC servomotor have a phase difference of 90o, a rotating magnetic field generated by the phase difference rotates a rotor, and a torque is proportional to the magnitude of a control signal voltage and linearly decreases according to the speed.

In addition, although both a BrushLess DC (BLDC) motor and a Permanent Magnet Synchronous (PMSM) motor have the same basic structure of three-phase, there may be a difference in that whether a back electro motive force (Back EMF) is a trapezoidal wave or a sinusoidal wave.

A coil is wound in a concentrated winding method in the BLDC motor and in a distributed winding method in the PMSM motor.

In the case of the PMSM motor which is used for most of industrial servomotors in these days, a rotating part (rotor) is made of a permanent magnet, and a coil of three-phase is wound a part which provides current (stator). Here, since the stator is three-phase, if a power of three-phase is supplied, a rotating magnetic field is generated inside the PMSM motor, and the rotor (magnet) rotates in synchronization with the rotating magnetic field.

Since the PMSM motor does not have a brush, the most outstanding disadvantage is being free from abrasion of a brush, and as a space vector control technique is commercialized, the PMSM motor substitutes for an existing DC motor and is controlled in a method similar to that of the DC motor.

In addition, the PMSM motor may directly control the torque and exhibits excellent performance in speed control, position control and the like.

On the other hand, a lot of studies on the BLDG motor are under progress recently, and the BLDC motor is frequently used for controlling high torque and high speed, whereas the PMSM motor mainly used for a precise servo is in the middle of commercialization. Specifically, the BLDC motor may be used to control the speed of a missile, a belt of a treadmill or the like.

Basically, a processor is used to control the industrial AC servomotor, the BrushLess DC (BLDC) motor and the Permanent Magnet Synchronous (PMSM) motor described above, which are commonly used for a production and service robot and an automated system.

The processor performs a function of analyzing a command received from a user, performing an operation corresponding to the command and outputting a result of the operation, and a device which integrates an operation device, an analysis device and a control device into a component like this is referred to as a microprocessor or a processor.

Since a motor control module using such a processor separates a motor control means and configures as a system-on-chip SoC, load on the processor is lowered, and performance of the system is improved.

On the other hand, a general purpose processor such as a DSP is used to control and operate the industrial AC servomotor, the BLDC motor and the PMSM motor of the prior art, and an algorithm for driving the motors is implemented as firmware and performs control and operation at every sampling time.

At this point, it is programmed to perform a control and operation algorithm function by setting a timer interrupt service routine (a timer ISR) in order to perform an operation at each accurate sampling time.

However, if a controller based on firmware is designed in the technique of the prior art as described above, a time for performing a control and operation function is restricted by the performance of a processor used for the control and operation.

For this reason, a high-speed processor should be used in order to enhance control performance, and this will lead to increase of a unit price, and since a developer should implement a controller and a filter used for operation, difficulties in developing a motor control system will be increased, and thus a solution for this problem is required.

SUMMARY OF THE INVENTION

Technical Problem

Therefore, the present invention has been made in view of the above problems, and it is an object of the present invention to provide a user with a network-based motor control system-on-chip (SoC) and a motor control method.

Specifically, the present invention relates to a network-based motor control system-on-chip (SoC) and a motor control method, in which system performance is improved by simultaneously using a processor for motor control and a processor for a network and sharing data among multiple processors using a shared memory (SRAM).

The technical problems to be solved by the present invention are not limited to the technical problems described above, and other unmentioned technical problems will be clearly understood by those skilled in the art from the following descriptions.

Solution to the Problem

To accomplish the above object, according to one aspect of the present invention, there is provided a network-based motor control system including: a network unit; a first processor for exchanging a first data with the network unit and processing a first task related to the first data; a motor; a motor control unit for controlling operation of the motor; a second processor for exchanging a second data related to the operation of the motor with the motor control unit and processing a second task related to the second data; and a data sharing unit for sharing processing results of the first task and the second task by the first processor and the second processor, in which the first task and the second task may be concurrently processed.

In addition, the motor control unit may include a plurality of pieces of hardware respectively corresponding to a plurality of operation functions based on firmware configured as logic to process the second data, and the plurality of pieces of hardware may be configured as a SoC.

In addition, the plurality of operation functions may include an analog to digital (ADC) conversion function, a digital to analog (DAC) conversion function, a general purpose input/output (GPIO) function, a Capture & Compare function, a Space Vector Pulse Width Modulation (SVPWM) function, an Encoder Interpolation function, a Profile Generation function, and a Digital Quotient (DQ) conversion function.

In addition, the data sharing unit may allow the processing results of the first task and the second task to be shared using a shared memory (SRAM).

In addition, a method of sharing the processing results of the first task and the second task may be an edge interrupt method between the first processor and the second processor.

In addition, the second processor may create an initial reference position of the motor, and the motor control unit may control operation of the motor by comparing a current position of the motor with the initial reference position provided by the second processor.

In addition, the motor control unit may inform the second processor that the motor has moved to a correct position by generating an interrupt signal if the current position of the motor is equal to the reference position or may control to change a position of the motor if the current position of the motor is different from the reference position.

According to another aspect of the present invention, there is provided a network-based motor control method including the steps of: exchanging a first data with a network unit by a first processor and exchanging a second data related to operation of a motor with a motor control unit by a second processor; processing a first task related to the first data by the first processor and processing a second task related to the second data by the second processor; and sharing processing results of the first task and the second task by the first processor and the second processor through a data sharing unit, in which the first task and the second task may be concurrently processed.

In addition, the data sharing unit may allow the processing results of the first task and the second task to be shared using a shared memory (SRAM), and a method of sharing the processing results of the first task and the second task may be an edge interrupt method between the first processor and the second processor.

In addition, the step of processing the second task by the second processor may include the steps of: creating an initial reference position of the motor by the second processor; and informing the second processor that the motor has moved to a correct position by generating an interrupt signal if a current position of the motor is equal to the reference position and controlling to change a position of the motor if the current position of the motor is different from the reference position, by the motor control unit.

Advantageous Effects of the Invention

The network-based motor control system-on-chip (SoC) and a motor control method related to at least one embodiment of the present invention configured as described above may maximize system performance by simultaneously using a processor for motor control and a processor for a network and sharing data among multiple processors using a shared memory (SRAM).

The effects obtained from the present invention are not limited to the effects described above, and other unmentioned effects will be clearly understood by those skilled in the art from the following descriptions.

DETAILED DESCRIPTION

A central processing unit (CPU) is a device which provides a function for processing the entire data of a corresponding device. That is, the CPU performs a function of analyzing a command received from a user, performing an operation corresponding to the command and outputting a result of the operation.

In addition, a device which integrates an operation device, an analysis device and a control device into a component like this is referred to as a microprocessor or a processor. The CPU and the microprocessor are frequently used in almost the same meaning, and it is assumed in this specification that they have the same meaning in order to avoid confusion.

The most fundamental function of the CPU is an operation and calculation task. For example, if a user issues a command of '0+1', the CPU receives and calculates the command and displays a result of '1' on an image output device, and the CPU may process a variety of data such as a document, a picture, music and a moving image.

An operation speed of a CPU may vary depending on the type of the CPU. A representative unit for expressing the speed of a CPU is clock, and the clock is the number of steps of a task processed in the CPU per second and expressed as 'Hz (Hertz)' which is a unit of a frequency. Accordingly, it may be said that the higher the clock is, the faster the CPU is.

Although such a clock speed is an absolute measure for expressing performance of a CPU in the past, multi-core CPUs containing two or more cores in one CPU are introduced recently, and the number of the cores is regarded as another measure for expressing performance of a CPU.

The core in a CPU of a computer is a core part of a processing circuit embedded in the CPU, and it is natural in the past that one CPU has one core (single core).

However, as 'Pentium D' of Intel and 'Athlon 64 X2' of AMD, which are dual core CPUs having two cores, are introduced, multi-core CPUs are gradually generalized.

In addition, even quad core CPUs having four cores are introduced recently. For example, 'Core2 Quad' of Intel has been introduced.

In addition, even 'Phenom X3' of AMD, which is a triple core CPU between the dual core and quad core CPUs, and hexa core CPUs embedded with six cores are also used.

Such multi-core CPUs exhibit performance similar to that of actually mounting as many CPUs as the number of embedded cores. That is, a dual core CPU may enhance overall processing efficiency since it can complete a task that should be processed in two steps in a general single core CPU only in a single step.

However, the multi-core CPU may obtain a true effect of improving performance when the multi-core CPU simultaneously processes several tasks (multitasking) or execute software optimized for multi-core operations. For example, the multi-core CPU may obtain a great effect when it is applied to a graphic editing program, a moving image encoding program, a file compression program or the like.

Basically, a processor is used to control the industrial AC servomotor, the BrushLess DC (BLDC) motor and the Permanent Magnet Synchronous (PMSM) motor described above, which are commonly used for a production and service robot and an automated system.

Since a motor control module using such a processor separates a motor control means and configures as a system-on-chip SoC, load on the processor is lowered, and performance of the system is improved.

On the other hand, a general purpose processor such as a DSP is used to control and operate the industrial AC servomotor, the BLDC motor and the PMSM motor of the prior art, and an algorithm for driving the motors is implemented as firmware and performs control and operation at every sampling time.

At this point, it is programmed to perform a control and operation algorithm function by setting a timer interrupt service routine (a timer ISR) in order to perform an operation at each accurate sampling time.

However, if a controller based on firmware is designed in the technique of the prior art as described above, a time for performing a control and operation function is restricted by the performance of a processor used for the control and operation.

For this reason, a high-speed processor should be used in order to enhance control performance, and this will lead to increase of a unit price, and since a developer should implement a controller and a filter used for operation, difficulties in developing a motor control system will be increased.

Figure 1:
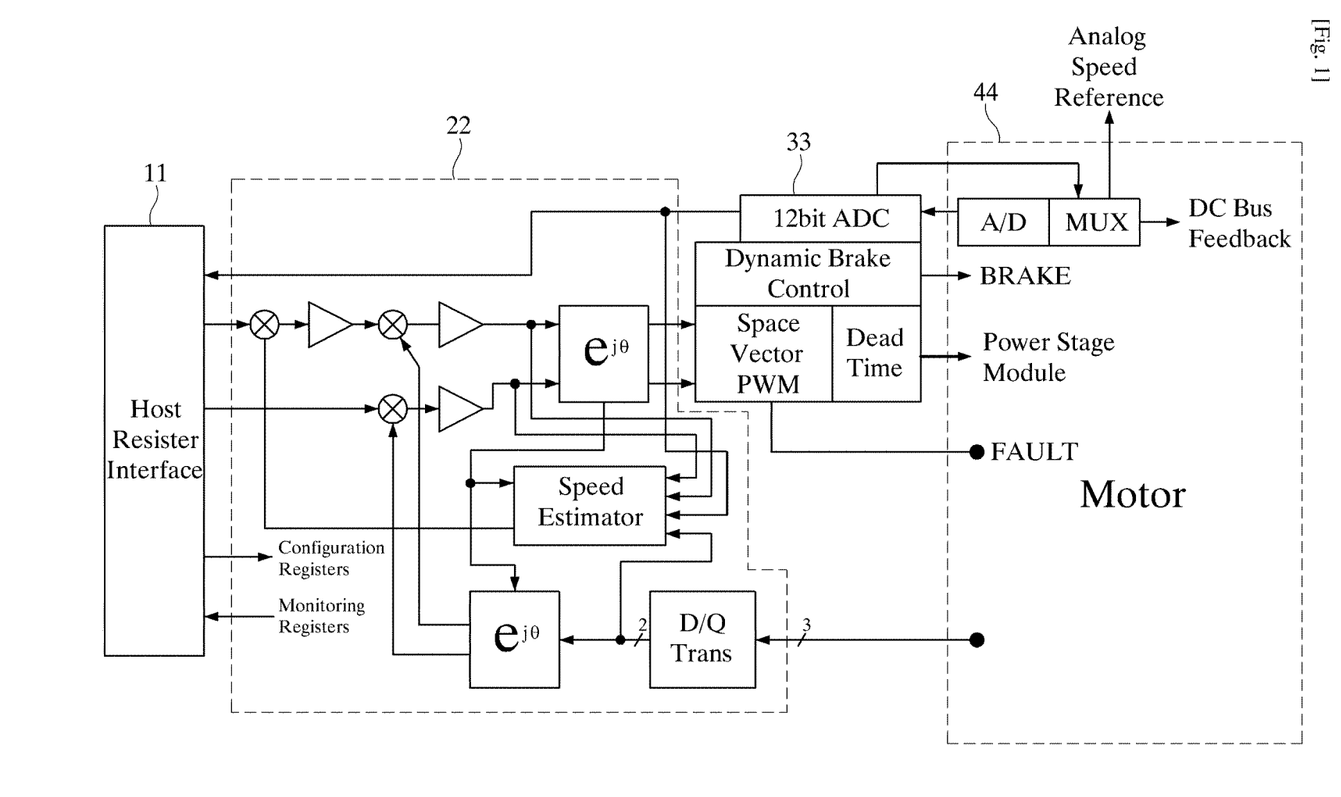
FIG. 1 a block diagram showing an example of conventional firmware for controlling a motor in relation to the present invention.

FIG. 1 a block diagram showing an example of conventional firmware for controlling a motor in relation to the present invention.

The firmware block diagram shown in FIG. 1 includes a host register interface 11, firmware 22 implementing an algorithm for driving a motor, a dynamic brake controller 33 and a motor 44. Since the constitutional components shown in FIG. 1 are not necessarily required, a firmware block having further more or further less constitutional components may be implemented.

In FIG. 1, the host register interface 11 provides a function of connecting an operation device and a register. Here, the register is a small-scaled data memory device embedded in the central processing unit of a computer.

In addition, the firmware 22 implementing an algorithm for driving a motor is used to control and operate an industrial AC servomotor, a BLDC motor and a PMSM motor of the prior art, and a general purpose processor such as a DSP is used for the control and operation. The algorithm for driving a motor is implemented as firmware, and control and operation of the motors can be performed at every sampling time.

The dynamic brake controller 33 is a generic term for controllers which control a non-contact type brake. Here, a dynamic brake is generally a brake which electrically stops rotation of a motor using a back electro motive force, an eddy current or the like.

In addition, the motor 44 is a power machine which receives power, rotates, and generates a rotation power on an axis thereof, which may be a DC motor, a single-phase AC motor, a three-phase AC motor or the like depending the type of supplied electricity.

However, it should be programmed to perform a control and operation algorithm function by setting a timer interrupt service routine (timer ISR) so that the firmware 22 implementing an algorithm for driving a motor in the firmware block diagram disclosed in FIG. 1 may perform an operation at each accurate sampling time.

Accordingly, in designing a controller based on the firmware 22 which implements an algorithm for driving a motor, overall performance of the system is determined by performance of a processor used in the system. This is since that a time for performing the control and operation function may vary depending on the processor.

Figure 2:
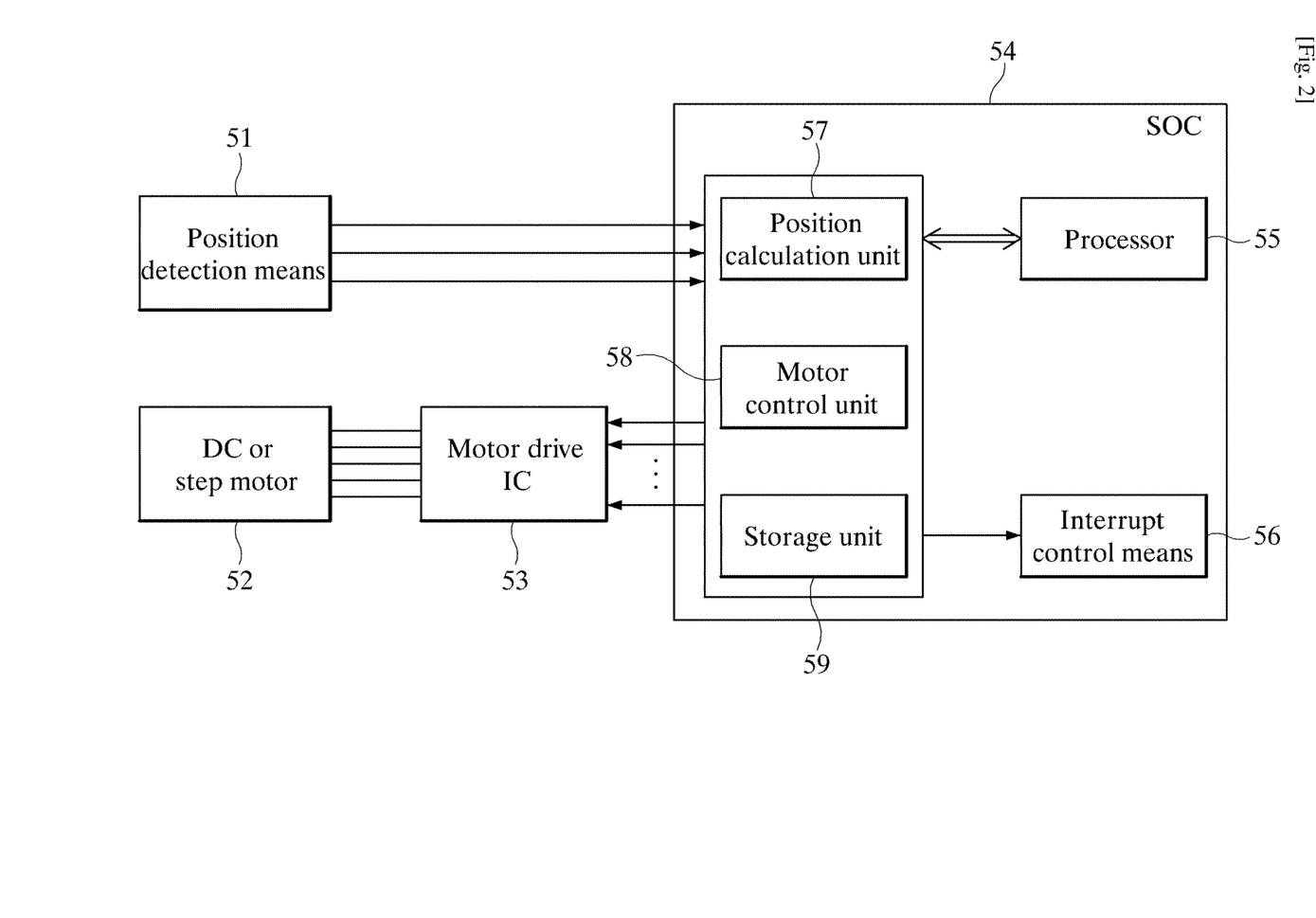
FIG. 2 is a view showing a conventional structure for transmitting and receiving data of a motor control unit configured as a system-on-chip SoC on a single processor in relation to the present invention.

In the structure shown FIG. 2, a method of configuring and using a control unit for controlling a position of a motor used in a camera module as a SoC is proposed in order to solve the problem.

That is, FIG. 2 is a view showing a conventional structure for transmitting and receiving data of a motor control unit configured as a system-on-chip SoC on a single processor in relation to the present invention.

However, since the invention shown in FIG. 2 mentions a method of controlling a position through an interrupt on a single processor and claims are limited to a device which controls a motor provided in a digital camera, a network is not supported.

That is, although the invention shown in FIG. 2 is applied, in designing a controller based on the firmware which implements an algorithm for driving a motor, the problem of determining overall performance of the system based on performance of a processor used in the system cannot be solved.

Accordingly, the present invention provides a network-based motor control system-on-chip (SoC) and a motor control method, in which system performance is improved by simultaneously using a processor for motor control and a processor for a network and sharing data among multiple processors using a shared memory (SRAM).

That is, a part implemented as firmware may be configured as logic as a method for solving the aforementioned problems. It is since that, generally, an operation can be performed faster when the logic is implemented in hardware rather than in software, and a processor-dependent part is configured as a system-on-chip (SoC) attached to an external bus of a high-speed embedded processor in order to solve the problem of being dependent on a processor.

Although the invention disclosed in FIG. 2 configures and uses a control unit for controlling a position of a motor used in a camera module as a SoC, since the invention mentions a method of controlling a position through an interrupt on a single processor and the invention is limited to a device which controls a motor provided in a digital camera, a network is not supported.

On the contrary, since control of an industrial motor applied to the present invention uses a network, the present invention can be applied as a motor control SoC and a motor control method which can be used for a network based industry, in addition to calculating a position of a motor, by adding logic related to motor control such as DQ conversion, SVPWM, DAC, ADC or the like and applying a multi-processor.

That is, the motor control unit according to the present invention may include a plurality of pieces of hardware respectively corresponding to a plurality of operation functions based on firmware configured as logic for processing data related to motor control, and the plurality of pieces of hardware may be configured as a system-on-chip (SoC).

The plurality of operation functions applied here may include an analog to digital (ADC) conversion function, a digital to analog (DAC) conversion function, a general purpose input/output (GPIO) function, a Capture & Compare function, a Space Vector Pulse Width Modulation (SVPWM) function, an Encoder Interpolation function, a Profile Generation function, and a Digital Quotient (DQ) conversion function.

Figure 3:
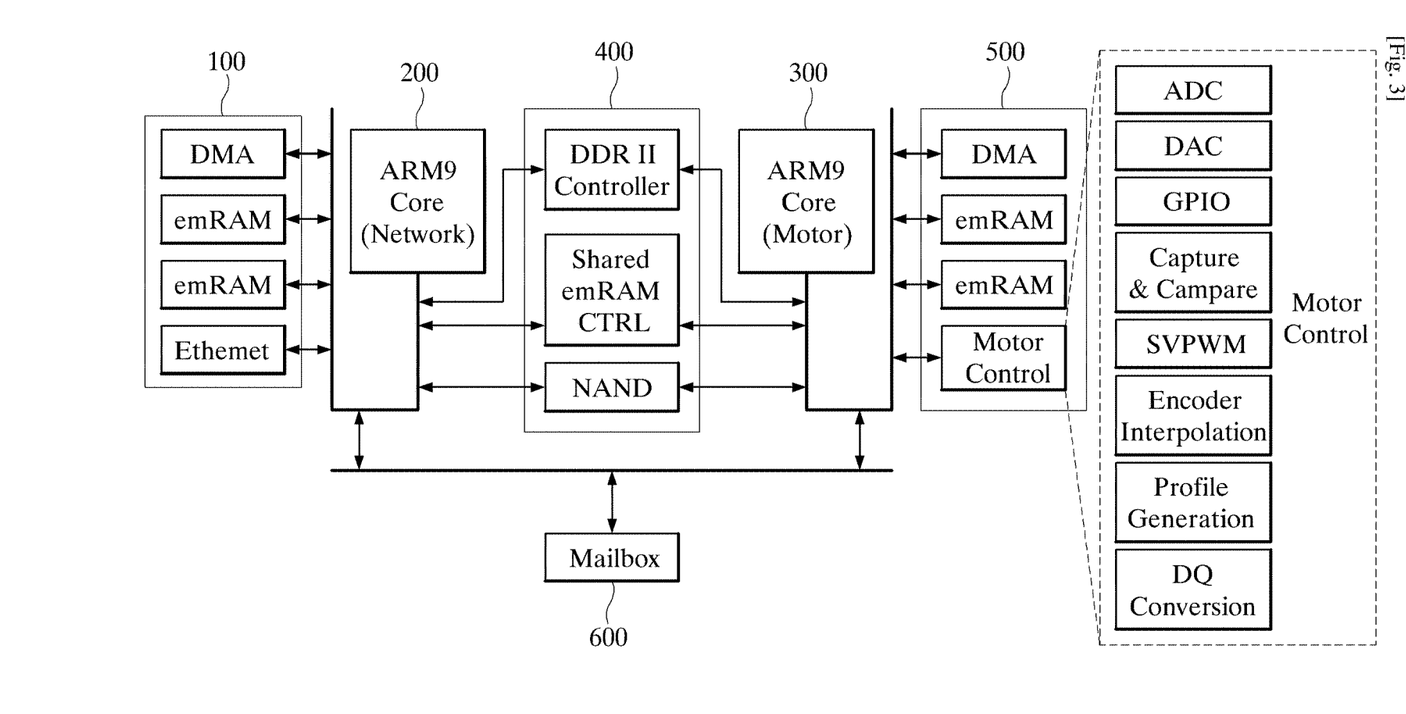
FIG. 3 is a block diagram showing a network-based motor control system-on-chip (SoC) simultaneously using a processor for motor control and a processor for a network in relation to the present invention.

FIG. 3 is a block diagram showing a network-based motor control system-on-chip (SoC) simultaneously using a processor for motor control and a processor for a network in relation to the present invention.

Hereinafter, a network-based motor control system-on-chip (SoC) related to the present invention will be described in further detail with reference to drawings. Suffixes such as "module" and "unit" used for constitutional components in the following description are attached or interchangeably used considering only convenience of creating the specification, and they do not have a meaning or a role distinguished from each other by themselves.

Referring to FIG. 3, the system proposed in the present invention may include a network unit 100, a network processor 200, a motor control processor 300, a data sharing unit 400 and a motor control unit 500. However, since the constitutional components shown in FIG. 3 are not necessarily required, a system having further more or further less constitutional components may be implemented.

First, the network unit 100 is a module which provides a function for configuring a network together with the network processor 200 and may include a DMA (Direct Memory Access), an emRAM (Random Access Memory), an emROM (Read Only Memory), an Ethernet and the like.

Here, the DMA (Direct Memory Access) is a method which allows an IO device controller to transfer data without executing a program by the CPU, and this method may improve input and output speed and reduce difference of speed between the CPU and peripheral devices.

In addition, the emRAM (Random Access Memory) is a memory device capable of reading stored information or storing other information, which can be used as a main memory device of a computer for temporarily loading an application program or temporary storing data.

In addition, the emROM (Read Only Memory) is a read-only memory device of a computer, which is a non-volatile memory device which does not lose information even when power is cut off. This is used for a character pattern generator or a code converter which processes a predetermined and voluminous task since information to memorize is determined at the moment when the element is manufactured.

In addition, the Ethernet is a local area network (LAN) of a bus structure.

Next, the network processor 200 is a processor for supporting multi-processing, which improves system performance by performing another network-based task.

That is, the network processor 200 may improve overall performance of the system by performing another task while the motor control processor 300 and the motor control unit 500 control a motor and sharing data with the motor control processor 300.

In addition, the motor control processor 300 provides a function of performing diverse operations related to motor control through the motor control unit 500.

Furthermore, the motor control processor 300 may improve overall performance of the system by sharing a data resulting from the operation with the network processor 200.

In addition, the data sharing unit 400 may have a structure using a shared memory (SRAM).

Here, the shared memory (SRAM) is a main memory device commonly used by a plurality of processors in a multi-processing system. That is, the shared memory (SRAM) is a memory device which is commonly used by a plurality of processing devices (processors) or a memory device shared by a plurality of processors when a multi-processing system is used.

Although the technique of the prior art described with reference to FIG. 2 has a structure of configuring a motor control unit as a SoC on a single processor and exchanging data through an interrupt control means in order to control a motor used in a camera module, the structure of the data sharing unit 400 proposed in the present invention is a structure using a shared memory (SRAM) in order to share data between two processors in a system including the motor control processor 300 and the network processor 200.

Although a DDR memory is frequently used in the prior art, a system proposed in the present invention may share data using SRAM. Here, a method of processing data using an inter-CPU interrupt method (edge interrupt), not an inter-process communication (IPC) method, is used as a data processing method.

In addition, the motor control unit 500 is configured as hardware in a system-on-chip (SoC) embedded with a processor which needs control of a motor.

Here, while the motor control unit 500 controls the motor through the motor control processor 300, the network processor 200 performs another task of the network unit 100. At this point, the motor control processor 300 may create an initial reference position of the motor.

In addition, the motor control unit 500 may include a motor control means for controlling movement of the motor by comparing a current position of the motor with the reference position of the motor.

As is disclosed in FIG. 3, the motor control unit 500 may include a DMA (Direct Memory Access), an emRAM (random access memory), an emROM (Read Only Memory) and the motor control means.

The motor control means may be implemented in logic including ADC, DAC, GPIO, Capture & Compare, SVPWM, Encoder Interpolation, Profile Generation, DQ conversion or the like.

According to the configuration of the present invention described through FIG. 3, since the motor control means is configured as hardware in a SoC embedded with multiple processors which needs control of a motor, the network processor 200 may perform another task while the motor control means controls the motor, and the network processor 200 and the motor control processor 300 interface a result of the motor control in an interrupt method, and thus overall performance of the system can be improved.

When the system proposed in the present invention is applied, a SoC configuring a firmware level as logic is provided. That is, since functions for calculating in software at a firmware terminal are configured as logic and constructed as a SoC, a system which provides high performance can be constructed regardless of performance of a processor.

Hereinafter, a detailed operation will be described with reference to FIGS. 4 and 5 based on the configuration of the present invention described above.

Figure 4:
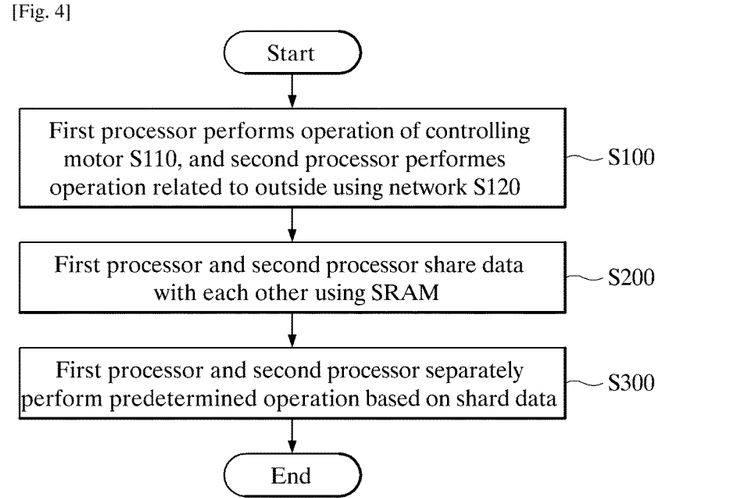
FIG. 4 is a flowchart illustrating an operation procedure of a network-based motor control system-on-chip (SoC) in relation to the present invention.

FIG. 4 is a flowchart illustrating an operation procedure of a network-based motor control system-on-chip (SoC) in relation to the present invention.

Referring to FIG. 4, while the motor control processor 300 performs an operation of controlling a motor S110, a step of performing an operation related to outside is performed by the network processor 200 using a network S120 S100.

Next, the network processor 200 and the motor control processor 300 may share data with each other using SRAM of the data sharing unit 400 S200.

In addition, the network processor 200 and the motor control processor 300 may separately perform a predetermined operation based on the shard data S300.

Accordingly, since the motor control means is configured as hardware in a SoC embedded with multiple processors which needs control of a motor, the network processor 200 may perform another task while the motor control means controls the motor, and the network processor 200 and the motor control processor 300 interface a result of the motor control in an interrupt method, and thus overall performance of the system can be improved.

Hereinafter, the step of performing an operation of controlling a motor by the motor control processor 300 will be described in further detail with reference to FIG. 5.

Figure 5:
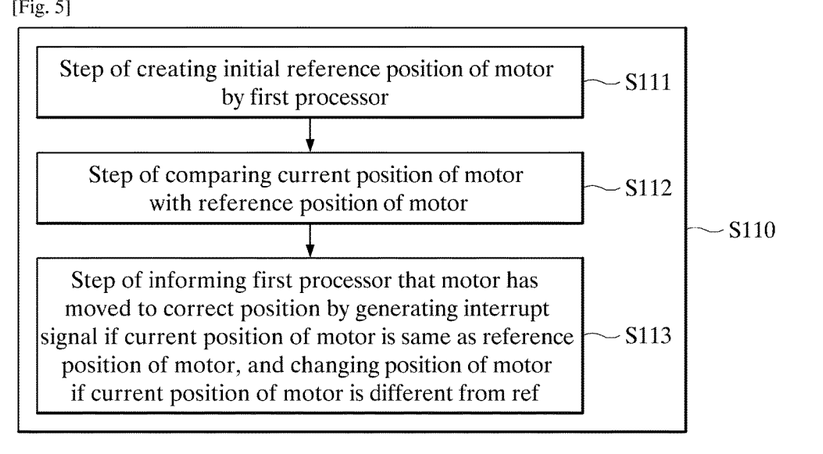
FIG. 5 is a flowchart illustrating a detailed operation of controlling a motor by a first processor in relation to step S110 of FIG. 4.

FIG. 5 is a flowchart illustrating a detailed operation of controlling a motor by the motor control processor 300 in relation to step S110 of FIG. 4.

Referring to FIG. 5, first, the motor control processor 300 may create an initial reference position of a motor S111.

Next, the motor control unit 500 may compare a current position of the motor with the reference position of the motor S112.

At this point, the motor control unit 500 may inform the motor control processor 300 that the motor has moved to a correct position by generating an interrupt signal if the current position of the motor is the same as the reference position of the motor or may control to change the position of the motor if the current position of the motor is different from the reference position of the motor S113.

Accordingly, a precise work can be performed by precisely changing a position of the motor through the procedure described above.

Figure 6:
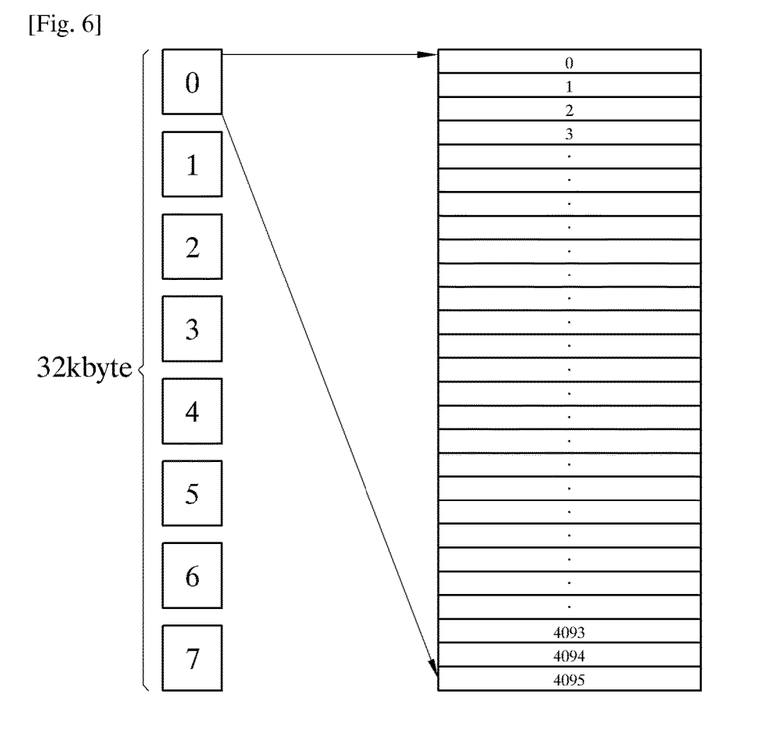
FIG. 6 is a view showing an example of a shared memory structure applied to the present invention.

FIG. 6 is a view showing an example of a shared memory structure applied to the present invention.

Referring to FIG. 6, a method of using and accessing a shared memory based on multiple cores proposed in the present invention is shown in the figure.

Access to a shared memory may not be concurrently performed in a computer system. Accordingly, in the present invention, a method of accessing a shared memory on each operating system by multiple processors, not by a single processor, is applied.

Although there are a variety of methods for accessing a shared memory, it is not easy to use a shared memory in a multi-processor multi-OS system. Although it is general that a DDR memory is most frequently used as a shared memory, SRAM is used as a shared memory in the system according to the present invention.

At this point, a restricted shared memory structure is as shown in FIG. 6, and the size of the memory is 32K byte. There are eight slots in total, and each of the slots has 4096 addresses of one byte size.

Figure 7:
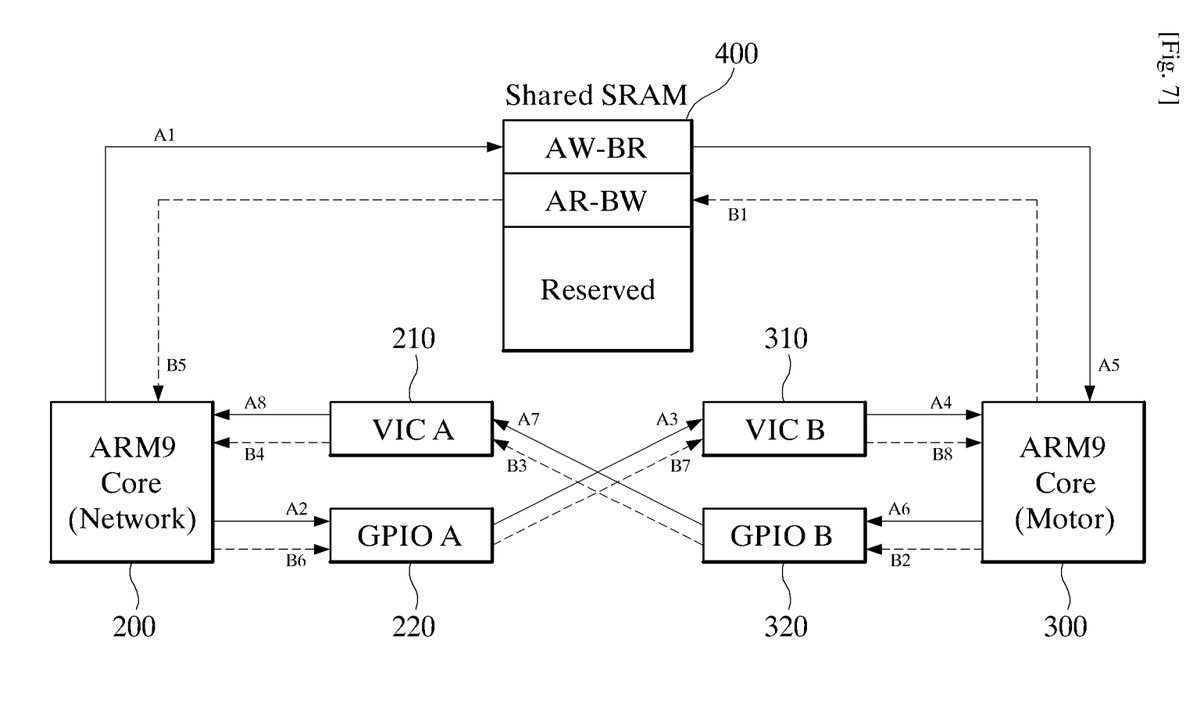
FIG. 7 is a view specifically illustrating a procedure of processing data among a plurality of processors applied to the present invention.

In addition, FIG. 7 is a view specifically illustrating a procedure of processing data among a plurality of processors applied to the present invention.

As is disclosed in FIG. 7, an interrupt routine is executed through the network processor 200, the motor control processor 300 and SRAM of the data sharing unit 400.

Specifically, the network processor 200 first writes the AW_BR, and then the motor control processor 300 reads the AW_BR.

In addition, the motor control processor 300 first writes the AR_BW, and then the network processor 200 reads the AR_BW.

Figure 8:
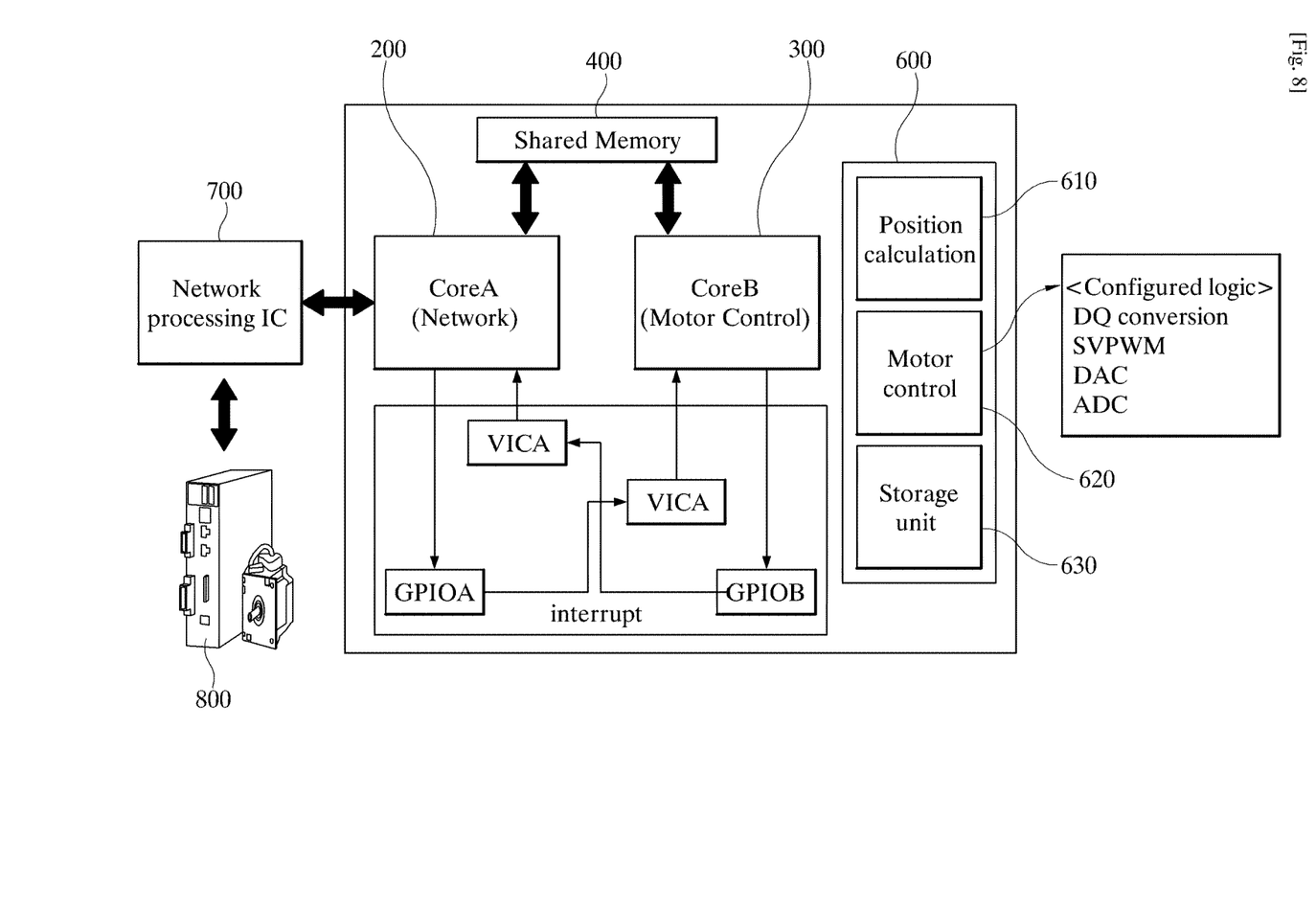
FIG. 8 is a view illustrating a procedure of processing a command through a network in relation to the present invention.

Meanwhile, FIG. 8 is a view illustrating a procedure of processing a command through a network in relation to the present invention.

In FIG. 8, a procedure of processing a command based on a network according to the present invention is shown.

A communication method such as RTEX, M-LINK, EtherCAT or the like is currently used as an industrial network.

As shown in FIG. 8, a system according to the present invention proposes a structure capable of processing a command through an industrial network.

That is, if the network processor 200 receives information on a controller from outside and transfers the information to the motor control processor 300, the network processor 200 may receive and process a corresponding data after the motor control processor 300 processes related data.

When the configuration of the present invention described above is applied, since the motor control means is configured as hardware in a SoC embedded with multiple processors which needs control of a motor, the network processor 200 may perform another task while the motor control means controls the motor, and the network processor 200 and the motor control processor 300 interface a result of the motor control in an interrupt method, and thus overall performance of the system can be improved.

In addition, when the system proposed in the present invention is applied, since functions for calculating in software at a firmware terminal are configured as logic and constructed as a SoC, a system which provides high performance can be constructed and provided to a user regardless of performance of a processor.

Meanwhile, according to an embodiment of the present invention, the method described above may be implemented in a code that can be read by a processor, in a medium recoding a program. An example of the medium that can be read by a processor is ROM, RAM, CD-ROM, a magnetic tape, a floppy disk, an optical data storage device or the like, and it can be implemented in the form of a carrier wave (e.g., transmission through the Internet).

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A network-based motor control system-on-chip (SOC) system comprising:
   a first processor configured to exchange a first data with a network unit and configured to process a first task related to the first data;
   a motor control unit configured to control operation of a motor;
   a second processor configured to
      exchange a second data related to the operation of the motor with the motor control unit and configured to process a second task related to the second data and create an initial reference position of the motor, and the motor control unit is configured to control operation of the motor by comparing a current position of the motor with the initial reference position provided by the second processor; and
   a shared memory unit configured to share processing results of the first task and the second task by the first processor and the second processor,
   wherein the first task and the second task are configured to be concurrently processed, and
   wherein the motor control unit is configured to one of
      inform the second processor that the motor has moved to a correct position by generating an interrupt signal if the current position of the motor is equal to the reference position, or
      control to change a position of the motor if the current position of the motor is different from the reference position.

2. The system according to claim 1, wherein the motor control unit includes a plurality of pieces of hardware respectively corresponding to a plurality of operation functions based on firmware configured as logic to process the second data, and the plurality of pieces of hardware is configured as a System-On-Chip (SoC).

3. The system according to claim 2, wherein the plurality of operation functions includes
   an analog to digital (ADC) conversion function,
   a digital to analog (DAC) conversion function,
   a general-purpose input/output (GPIO) function,
   a Capture & Compare function,
   a Space Vector Pulse Width Modulation (SVPWM) function,
   an Encoder Interpolation function,
   a Profile Generation function, and
   a Digital Quotient (DQ) conversion function.

4. The system according to claim 1, wherein the shared memory unit is configured to allow the processing results of the first task and the second task to be shared.

5. The system according to claim 4, wherein the sharing the processing results of the first task and the second task is configured to be an edge interrupt method between the first processor and the second processor.

6. A network-based motor control method comprising the steps of:
   exchanging a first data with a network unit by a first processor and exchanging a second data related to operation of a motor with a motor control unit by a second processor;
   processing a first task related to the first data by the first processor;
   processing a second task related to the second data by the second processor;
   creating an initial reference position of the motor by the second processor;
   one of
      informing the second processor that the motor has moved to a correct position by generating an interrupt signal if a current position of the motor is equal to the reference position, or
      controlling to change a position of the motor if the current position of the motor is different from the reference position, by the motor control unit; and
   sharing processing results of the first task by the first processor and processing results of the second task by the second processor through a shared memory unit,
   wherein the first task and the second task are concurrently processed.

7. The method according to claim 6, wherein the shared memory unit allows the processing results of the first task and the second task to be shared, and a method of sharing the processing results of the first task and the second task is an edge interrupt method between the first processor and the second processor.

* * * * *